United States Patent [19]

Gregory et al.

[11] Patent Number: 5,177,195
[45] Date of Patent: Jan. 5, 1993

[54] DISAZO DYES

[75] Inventors: Peter Gregory, Bolton; Prahalad M. Mistry, Ashton-under-Lyne, both of England

[73] Assignee: Imperial Chemical Industries PLC, London, England

[21] Appl. No.: 816,676

[22] Filed: Jan. 3, 1992

[30] Foreign Application Priority Data

Jan. 8, 1991 [GB] United Kingdom ................ 9100304

[51] Int. Cl.$^5$ ...................... C09B 31/08; C09D 11/02; C09D 11/00
[52] U.S. Cl. ................. 534/829; 106/22 R; 534/628
[58] Field of Search .............. 534/829, 834, 836, 837, 534/628

[56] References Cited

U.S. PATENT DOCUMENTS

| | | | |
|---|---|---|---|
| 4,626,284 | 12/1986 | Ohta et al. | 534/829 X |
| 4,752,337 | 6/1988 | Kunde | 534/829 X |
| 4,841,037 | 6/1989 | Ohta et al. | 534/829 X |
| 4,963,189 | 10/1990 | Hindagolla | 534/837 X |
| 5,062,893 | 11/1991 | Adamic et al. | 534/837 X |

FOREIGN PATENT DOCUMENTS 60-81249  5/1985  Japan ................................. 534/829

OTHER PUBLICATIONS

Chemical Abstracts, vol. 103, No. 20, Nov. 1985, Columbus, Ohio, U.S.; Abstract No. 161869A, "naphthalene disazo compounds" p. 73 Mitsubishi.

Greenwood et al, Chemical Abstracts, vol. 103, #61303z (1990).

*Primary Examiner*—Floyd D. Higel
*Attorney, Agent, or Firm*—Cushman, Darby & Cushman

[57] ABSTRACT

A compound which, in the free acid form, is of the Formula (1):

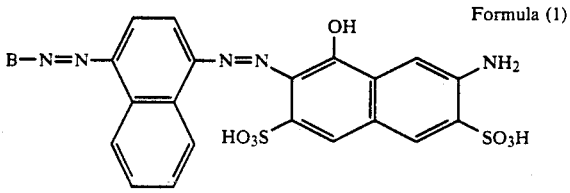

wherein
  B is 3,4- or 3,5-dicarboxyphenyl.

The compound is useful in the preparation of inks for ink jet printing of paper, on which it has high waterfastness and low bronzing.

4 Claims, No Drawings

DISAZO DYES

This invention relates to a bisazo compound and in particular a black anionic dye which is suitable for use in the coloration of various substrates.

According to a first aspect of the present invention there is provided a compound which, in the free acid form, is of the Formula (1):

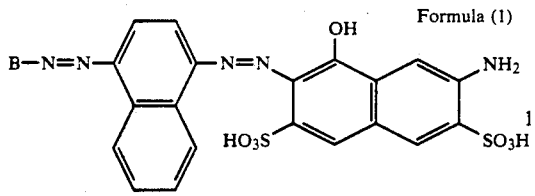

Formula (1)

wherein
B is 3,4- or 3,5-dicarboxyphenyl.

It is preferred that B is 3,5-dicarboxyphenyl because such a compound shows negligible bronzing when printed on plain paper.

The preferred compound of Formula (1) is in the form of a salt with a cation or mixture of cations, for example in the form of an alkali metal, ammonium or optionally substituted lower alkyl ammonium salt. The cation is preferably ammonium or optionally substituted lower (i.e., $C_{1-4}-$) alkyl ammonium. A preferred optional substituent which may be present on the optional substituted lower alkyl ammonium cations is a hydroxy group. Especially preferred cations are ammonium, mono-, di-, tri- and tetra-($C_{1-4}$-alkyl)ammonium and mono-, di-, tri- and tetra- (hydroxy-$C_{1-4}$-alkyl)ammonium. It is, however, most preferred that the compounds are in the form of an ammonium (i.e., $NH_4^+$) or mixed ammonium and alkali metal (especially sodium) salt.

Examples of optionally substituted lower alkylammonium cations include methylammonium, ethylammonium, dimethylammonium, diethylammonium, trimethyammonium, triethylammonium, tetramethylammonium and tri(2-hydroxyethyl)ammonium.

The present compounds may be prepared by diazotising 3,4- or 3,5-dicarboxyaniline, coupling with alpha-naphthylamine to give a monoazo compound, diazotising the resultant monoazo compound and coupling with 2R-acid.

The compounds of the present invention can be converted into their ammonium or optionally substituted lower alkylammonium salt by dissolving the dye in the form of a salt with an alkali metal, acidifying with a mineral acid, adjusting the solution to pH 9-9.5 with ammonia or an optionally substituted lower alkylamine and removing alkali metal chloride ions by dialysis.

The compounds of the present invention are useful as dyes for the coloration of inks, and are notable for the good water fastness and the deep black shades with high optical density and minimal "bronzing" of their prints on plain paper. The compounds also have good solubility in aqueous media at pHs which cause little or no corrosion to the mechanism of ink jet printing devices. The preferred compounds are intended for use in ink jet printing.

A suitable ink comprises a mixture of one or more compounds according to the first aspect of the present invention and a liquid medium, preferably an aqueous medium, for example an ink analogous to those described in U.S. Pat. No. 4,963,189. It is preferred that the compound or compounds are completely dissolved in the liquid medium to form a solution.

The ink preferably contains from 0.5% to 20%, more preferably from 0.5% to 15%, and especially from 1% to 5%, by weight of the compound based on the total weight of the ink.

The liquid medium is preferably water or a mixture comprising water and a water-soluble organic solvent, preferably respectively in a weight-to-weight ratio of 99:1 to 1:99, more preferably 95:1 to 50:50, especially 90:10 to 60:40.

The water-soluble organic solvent is preferably a $C_1-C_4$-alkanol such as methanol, ethanol, n-propanol, isopropanol, n-butanol, sec-butanol, tert-butanol or isobutanol; an amide such as dimethylformamide or dimethylacetamide; a ketone or ketone alcohol such as acetone or diacetone alcohol; an ether such as tetrahydrofuran or dioxane; a polyalkylene glycol such as polyethylene glycol or polypropylene glycol; an alkylene glycol or thioglycol containing a $C_2-C_6$ alkylene group such as ethylene glycol, propylene glycol, butylene glycol or triethylene glycol; a thiodiglycol, hexylene glycol, or diethylene glycol; a polyol such as glycerol or 1,2,6-hexanetriol; a lower alkyl ether of a polyhydric alcohol such as 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol or N-methylpyrrolidone; or a mixture containing two or more of the aforementioned water-soluble organic solvents.

The preferred water-soluble organic solvent is an alkylene glycol or lower alkyl ether of a polyhydric alcohol such as ethylene glycol, diethylene glycol, triethylene glycol or 2-methoxy-2-ethoxy-2-ethoxyethanol; or a polyethylene glycol with a molecular weight of up to 500. A preferred specific solvent mixture is a binary mixture of water and diethylene glycol in a weight-to-weight ratio as mentioned above.

It is preferred that the ink of the present invention contains a penetrant which assists permeation of the compound into a substrate such as paper and optionally up to 0.5% by weight of sodium borate.

A further aspect of the present invention provides a process for printing a substrate with an ink using an ink jet printer, characterised in that the ink contains at least one compound according to the first aspect of the present invention.

A suitable process for the application of an ink according to the invention to a substrate, for example paper, comprises forming the ink into small droplets by ejection from a reservoir through a small orifice so that the droplets of ink are directed at the substrate; this process is commonly referred to as ink jet printing, and the preferred processes for application of the inks hereinbefore defined are piezoelectric ink jet printing, and in particular thermal ink jet printing. In thermal ink jet printing programmed pulses of heat are applied to the ink adjacent to the orifice during relative movement between the substrate and the reservoir.

The preferred substrate is a cellulosic substrate, especially paper. The type of ink jet printer is not believed to be critical; however, it is preferably a thermal ink jet printer.

The preferred ink used in the process is as hereinbefore described.

According to a still further aspect of the present invention there is provided paper printed with a compound according to the invention.

The invention is further illustrated by the following Examples in which all parts and percentages are by weight unless otherwise indicated.

EXAMPLE 1

Preparation of
1-hydroxy-2-(4-[3,5-dicarboxyphenylazo]-naphth-1-ylazo)-3,6-disulpho-7-aminonaphthalene, sodium salt

Stage 1, 1-amino-4-(3,5-dicarboxyphenylazo)naphthalene

5-Aminoisophthalic acid (18.1 g, 0.1M) was stirred in water (150 ml) at room temperature and 2N NaOH added to form a solution at pH 8.0. 2N $NaNO_2$ solution (50 ml) was added and the mixture stirred to homogenise. The solution was added gradually to a mixture of ice/water (150 ml) and 36% HCl (50 ml) at 5° C. and the resulting suspension stirred for 2 hours at 50° C. Sulphamic acid solution (10%) was added in order to remove excess nitrous acid.

1-Naphthylamine (14.3 g, 0.1M) was dissolved in water (300 ml) and 36% HCl (15 ml) at 70° C. and cooled to room temperature. The resulting suspension was added to the above diazo suspension at 10° C. and the pH adjusted to 4.5 by the addition of sodium acetate. The mixture was stirred for 18 hours and the dye collected by filtration and washed with water (100 ml).

Stage 2

The paste from Stage 1 (0.1M) was dissolved in water (100 ml) and 2N NaOH solution at pH 9.0. 2N $NaNO_2$ solution (50 ml) was added and the mixture stirred for 3 minutes. The solution was added gradually to a mixture of ice/water (150 ml) and 36% HCl (50 ml) at 5° C. using rapid agitation. The resulting suspension was stirred for 1 hour at 5° C. Sulphamic acid solution (10%) was added in order to remove excess nitrous acid to give a diazo suspension.

2R acid (23.9 g, 0.1M) was dissolved in water (150 ml) and 2N NaOH solution at pH 9.0. $Na_2CO_3$ (10 g) was added and the solution cooled to 0°-10° C. To this was added the above diazo suspension, while holding the pH at 8.0 to pH 9.0 with 20% $Na_2CO_3$ solution. The solution was stirred for 1 hour at 0°-10° C. and aqueous NaCl (10% w/v) added.

The precipitated dye was collected by filtration and washed with 10% NaCl solution (100 ml). The paster was redissolved in water (150 ml) and 2N NaOH solution at pH 9.0. The solution was heated to 50° C. and NaCl aqueous solution (15% w/v) added and the precipitated dye collected by filtration and washed with 10% NaCl solution (100 ml).

The product was the trisodium salt of 1-hydroxy-2-(4-[3,5-dicarboxyphenylazo]-naphth-1-ylazo)-3,6-disulpho-7-aminonaphthalene.

An example of a specific ink containing the title dye is:

| Ink | Title Dye (parts) | Liquid medium (parts) |
| --- | --- | --- |
| 1 | (2.5) | Water (92.5) |
|   |   | Ethylene glycol (7.5) |

When this ink was printed onto plain paper using a piezo or thermal ink-jet printing machine, the printed image obtained had good resistance to water and a deep black shade.

EXAMPLE 2

Preparation of
1-hydroxy-2-(4-[3,5-dicarboxy-phenylazo]-naphth-1-ylazo)-3,6-disulpho-7-aminonaphthalene, Ammonium salt The dye obtained in Example 1 was stirred in water (400 ml) at pH 8-9 until a complete solution was obtained. The solution was then slowly added to a mixture of concentrated hydrochloric acid (45 ml) and water (50 ml) and the suspension stirred for 30 minutes and then filtered to give a paste.

The paste was stirred in water (300 ml) and conc.ammonium hydroxide added to raise the pH to 9-9.5. The solution was then dialysed to remove chloride ions and then evaporated to give the mixed ammonium sodium salt of the title dye.

An ink was prepared as in Example 1 but using the title dye and when printed onto plain paper using a thermal ink jet printing machine, the printed image obtained had a high resistance to water and gave deep black shades with little bronzing.

EXAMPLE 3

Preparation of various salts of
1-hydroxy-2-(4-[3,5-dicarboxyphenylazo]-naphth-1-ylazo)-3,6-disulpho-7-aminonaphthalene (a) In place of the ammonium hydroxide used in Example 2 there can be used separately methylamine, dimethylamine and trimethylamine to give the respective mixed amine-sodium salts of 1-hydroxy-2-(4-[3,5-dicarboxyphenylazo]-naphth-1-ylazo)-3,6-disulpho-7-aminonaphthalene.

Inks can be prepared as in Example 1 and printed onto plain paper using a thermal ink jet printing machine.

(b) In place of ammonium hydroxide used in Example 2 there can be used ethylamine, n-propylamine, isopropylamine, n-butylamine, iso-butylamine, sec-butylamine, tert-butylamine, piperidine, pyridine, morpholine, allylamine, diethylamine or triethylamine.

EXAMPLE 4

Preparation of Inks

Further inks according to the invention may be prepared according to the following formulations:

| Ink | Dye from Example No (parts) | Liquid Medium (parts) |
| --- | --- | --- |
| 2 | 1 (1.0) | Water (60) |
|   |   | Ethylene Glycol (40) |
| 3 | 2 (3.0) | Water (65) |
|   |   | Glycerol (25) |
|   |   | Triethanolamine (10) |
| 4 | 1 (2.0) | Water (80) |
|   |   | Ethylene Glycol (15) |
|   |   | Polyethylene Glycol (MW200) (5) |
| 5 | 2 (1.5) | Water (89.8) |
|   |   | 2-Pyrrolidone (10) |
|   |   | Sodium Borate (0.2) |
| 6 | 2 (2.1) | Water (85) |
|   |   | Ethylene Glycol (10) |
|   |   | N-Methyl Pyrrolidone (5) |

Inks 2 to 6 may be printed onto paper using a thermal ink jet printing machine.

We claim:

1. A compound which, in the free acid form, is of the formula:

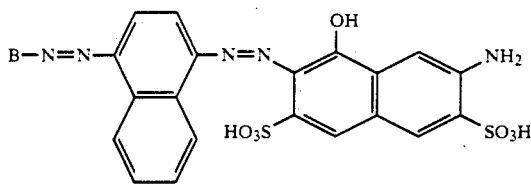

wherein
B is 3,4- or 3,5-dicarboxyphenyl.

2. A compound according to claim 1 wherein B is 3,5-dicarboxyphenyl.

3. A compound according to any one of the preceeding claims in the form of an ammonium or mixed ammonium and alkali metal salt.

4. A compound according to any one of the preceeding claims in the form of the ammonium salt.